(12) United States Patent
Kawano et al.

(10) Patent No.: US 10,390,410 B2
(45) Date of Patent: Aug. 20, 2019

(54) MUSIC SELECTION DEVICE FOR GENERATING LIGHTING CONTROL DATA, MUSIC SELECTION METHOD FOR GENERATING LIGHTING CONTROL DATA, AND MUSIC SELECTION PROGRAM FOR GENERATING LIGHTING CONTROL DATA

(71) Applicant: Pioneer DJ CORPORATION, Yokohama-shi, Kanagawa (JP)

(72) Inventors: Hirokatsu Kawano, Yokohama (JP); Toshiki Nakai, Yokohama (JP); Junichiro Inoue, Yokohama (JP)

(73) Assignee: PIONEER DJ CORPORATION, Yokohama-Shi (JP)

( * ) Notice: Subject to any disclaimer, the term of this patent is extended or adjusted under 35 U.S.C. 154(b) by 0 days.

(21) Appl. No.: 16/313,970

(22) PCT Filed: Jul. 5, 2016

(86) PCT No.: PCT/JP2016/069883
§ 371 (c)(1),
(2) Date: Dec. 28, 2018

(87) PCT Pub. No.: WO2018/008081
PCT Pub. Date: Jan. 11, 2018

(65) Prior Publication Data
US 2019/0200432 A1 Jun. 27, 2019

(51) Int. Cl.
*H05B 37/02* (2006.01)
*G10H 1/00* (2006.01)
*H04W 84/12* (2009.01)

(52) U.S. Cl.
CPC ....... *H05B 37/0209* (2013.01); *G10H 1/0008* (2013.01); *G10H 2210/031* (2013.01); *H04W 84/12* (2013.01)

(58) Field of Classification Search
CPC .................. G10H 1/0008; G10H 2210/031
See application file for complete search history.

(56) References Cited

U.S. PATENT DOCUMENTS

2011/0015765 A1* 1/2011 Haughay, Jr. ......... G06T 13/205
700/94

FOREIGN PATENT DOCUMENTS

| JP | 3743079 | 2/2006 |
|----|---------|--------|
| JP | 2012-150244 | 8/2012 |
| JP | 2014-038308 | 2/2014 |

OTHER PUBLICATIONS

English translation of International Preliminary Report on Patentability dated Jan. 8, 2019 (Jan. 8, 2019), Application No. PCT/JP2016/069883, 5 pages.
(Continued)

*Primary Examiner* — Douglas W Owens
*Assistant Examiner* — Jianzi Chen
(74) *Attorney, Agent, or Firm* — Rankin, Hill & Clark LLP (57) ABSTRACT

A device for selecting a music piece for generating lighting control data is configured to select, among pieces of music piece data each containing transition information of characteristic sections that characterize a music structure, a target piece of music piece data suitable for generating the lighting control data for each of the pieces of music piece data. The music piece selecting device includes: a transition information acquirer acquiring the transition information of the characteristic sections in each piece of music piece data; a characteristic section type determiner determining respective types of the characteristic sections based on the transition information of the characteristic sections acquired by the transition information acquirer; and a music piece data selector selecting the target piece of music piece data for generating the lighting control data based on the respective (Continued)

types of the characteristic sections determined by the characteristic section type determiner.

7 Claims, 7 Drawing Sheets

(56) References Cited

OTHER PUBLICATIONS

International Search Report, dated Aug. 9, 2016 (Aug. 9, 2016), 1 page.

\* cited by examiner

| | MUSIC PIECE 1 | MUSIC PIECE 2 | MUSIC PIECE 3 | MUSIC PIECE 4 | ... | MUSIC PIECE N |
|---|---|---|---|---|---|---|
| INTRO | YES | YES | YES | YES | ... | YES |
| VERSE | YES | NO | NO | NO | ... | NO |
| PRE-CHORUS | NO | NO | NO | NO | ... | YES |
| CHORUS | YES | YES | YES | YES | ... | YES |
| BRIDGE | NO | NO | YES | YES | ... | NO |
| POST-CHORUS | YES | YES | YES | YES | ... | YES |
| ENDING | YES | YES | YES | YES | ... | YES |

| MUSIC GENRE INFORMATION | TECHNO | | | | POPS | |
|---|---|---|---|---|---|---|
| MUSICAL TONE INFORMATION | MAJOR | MINOR | MAJOR | MINOR | MAJOR | MAJOR |
| MUSICAL DYNAMICS INFORMATION | LARGE | LARGE | LARGE | LARGE | SMALL | SMALL |
| MUSIC PIECE | MUSIC PIECE 1 | MUSIC PIECE 2 | MUSIC PIECE 3 | MUSIC PIECE 4 | ... | MUSIC PIECE N |
| INTRO | YES | YES | YES | YES | ... | YES |
| VERSE | YES | NO | NO | YES | ... | NO |
| PRE-CHORUS | NO | NO | NO | YES | ... | YES |
| CHORUS | YES | YES | YES | YES | ... | YES |
| BRIDGE | NO | NO | YES | NO | ... | NO |
| POST-CHORUS | YES | YES | YES | YES | ... | YES |
| ENDING | YES | YES | YES | YES | ... | YES |

FIG.5

| MUSIC GENRE INFORMATION | TECHNO | | | | POPS | |
|---|---|---|---|---|---|---|
| MUSICAL TONE INFORMATION | MAJOR | MINOR | MAJOR | MINOR | MAJOR | MAJOR |
| MUSICAL DYNAMICS INFORMATION | LARGE | LARGE | LARGE | LARGE | SMALL | SMALL |
| MUSIC PIECE | MUSIC PIECE 1 | MUSIC PIECE 2 | MUSIC PIECE 3 | MUSIC PIECE 4 | ... | MUSIC PIECE N |
| INTRO | YES | YES | YES | YES | ... | YES |
| VERSE | YES | NO | NO | YES | ... | NO |
| PRE-CHORUS | NO | NO | NO | YES | ... | YES |
| CHORUS | YES | YES | YES | YES | ... | YES |
| BRIDGE | NO | NO | YES | NO | ... | NO |
| POST-CHORUS | YES | YES | YES | YES | ... | YES |
| ENDING | YES | YES | YES | YES | ... | YES |

| MUSIC GENRE INFORMATION | TECHNO | | | | POPS | |
|---|---|---|---|---|---|---|
| MUSICAL TONE INFORMATION | MAJOR | MINOR | MAJOR | MINOR | MAJOR | MAJOR |
| MUSICAL DYNAMICS INFORMATION | LARGE | LARGE | LARGE | LARGE | SMALL | SMALL |
| MUSIC PIECE | MUSIC PIECE 1 | MUSIC PIECE 2 | MUSIC PIECE 3 | MUSIC PIECE 4 | ... | MUSIC PIECE N |
| INTRO | YES | YES | YES | YES | ... | YES |
| VERSE | YES | NO | NO | YES | ... | NO |
| PRE-CHORUS | NO | NO | NO | YES | ... | YES |
| CHORUS | YES | YES | YES | YES | ... | YES |
| BRIDGE | NO | NO | YES | NO | ... | NO |
| POST-CHORUS | YES | YES | YES | YES | ... | YES |
| ENDING | YES | YES | YES | YES | ... | YES |

FIG.7

MUSIC SELECTION DEVICE FOR GENERATING LIGHTING CONTROL DATA, MUSIC SELECTION METHOD FOR GENERATING LIGHTING CONTROL DATA, AND MUSIC SELECTION PROGRAM FOR GENERATING LIGHTING CONTROL DATA

TECHNICAL FIELD

The present invention relates to a device for selecting a music piece for generating lighting control data (hereinafter also referred to as "music piece selecting device"), a method for selecting a music piece for generating lighting control data (hereinafter also referred to as "music piece selecting method"), and a program for selecting a music piece for generating lighting control data (hereinafter also referred to as "music piece selecting program").

BACKGROUND ART

In a concert and a night club, it is important for stage effects to match lighting with a music piece or change lighting in synchronization with a music piece.

In order to obtain an accurate stage effect by matching lighting with a music piece, a dedicated lighting staff having a good understanding of the music piece desirably manipulates a lighting device. However, it is difficult in terms of costs and the like that the dedicated lighting staff constantly stays in a small-sized concert, night club, event and the like.

In order to overcome this difficulty, automatic lighting control depending on a music piece has been suggested. For instance, according to the technique of Patent Literature 1, lighting control data relating to lighting contents matched with a music piece is generated in advance and lighting is controlled based on the lighting control data in synchronization with the music piece as the music piece is played, thereby achieving a desired lighting effect matched with the music piece.

In order to generate the lighting control data, the music piece data being reproduced is analyzed in advance in terms of music structure to allocate characteristic sections (e.g., introduction section, verse section, pre-chorus section, chorus section, ending section, up-tone section, down-tone section, break section, music genre, and musical tone) that characterize the music structure and a lighting pattern suitable to an image of each characteristic section is assigned for the setting of lighting control.

CITATION LIST

Patent Literature(s)

Patent Literature 1: JP Patent No. 743079

SUMMARY OF THE INVENTION

Problem(s) to be Solved by the Invention

Unfortunately, the technique of Patent Literature 1 requires generating respective pieces of lighting control data for music pieces being played one by one. Thus, for instance, when a plurality of music pieces are to be played during a concert, this technique cannot eliminate difficulties in generating the lighting control data matched with the music piece data of each music piece.

An object of the invention is to provide a device for selecting a music piece for generating lighting control data, a method for selecting a music piece for generating lighting control data, and a program for selecting a music piece for generating lighting control data that are capable of efficiently generating respective pieces of lighting control data for a plurality of pieces of music piece data.

Means for Solving the Problem(s)

According to an aspect of the invention, a device for selecting a music piece for generating lighting control data is configured to select, among pieces of music piece data each containing transition information of characteristic sections that characterize a music structure, a target piece of music piece data suitable for generating the lighting control data for each of the pieces of music piece data. The device includes: a transition information acquirer configured to acquire the transition information of the characteristic sections in each of the pieces of music piece data; a characteristic section type determiner configured to determine respective types of the characteristic sections based on the transition information of the characteristic sections acquired by the transition information acquirer; and a music piece data selector configured to select the target piece of music piece data for generating the lighting control data based on the respective types of the characteristic sections determined by the characteristic section type determiner.

According to another aspect of the invention, a method for selecting a music piece for generating lighting control data is configured to select, among pieces of music piece data each containing transition information of characteristic sections that characterize a music structure, a target piece of music piece data suitable for generating the lighting control data for each of the pieces of music piece data. The method includes: acquiring the transition information of the characteristic sections in each of the pieces of music piece data; determining respective types of the characteristic sections based on the transition information of the acquired characteristic sections; and selecting the target piece of music piece data for generating the lighting control data based on the respective types of the characteristic sections as determined.

According to still another aspect of the invention, a program for selecting a music piece for generating lighting control data is configured to enable a computer to function as the above device.

DESCRIPTION OF EMBODIMENT(S)

[1] Overall Configuration of Sound Control System 1 and Lighting System 10

Figure 1:
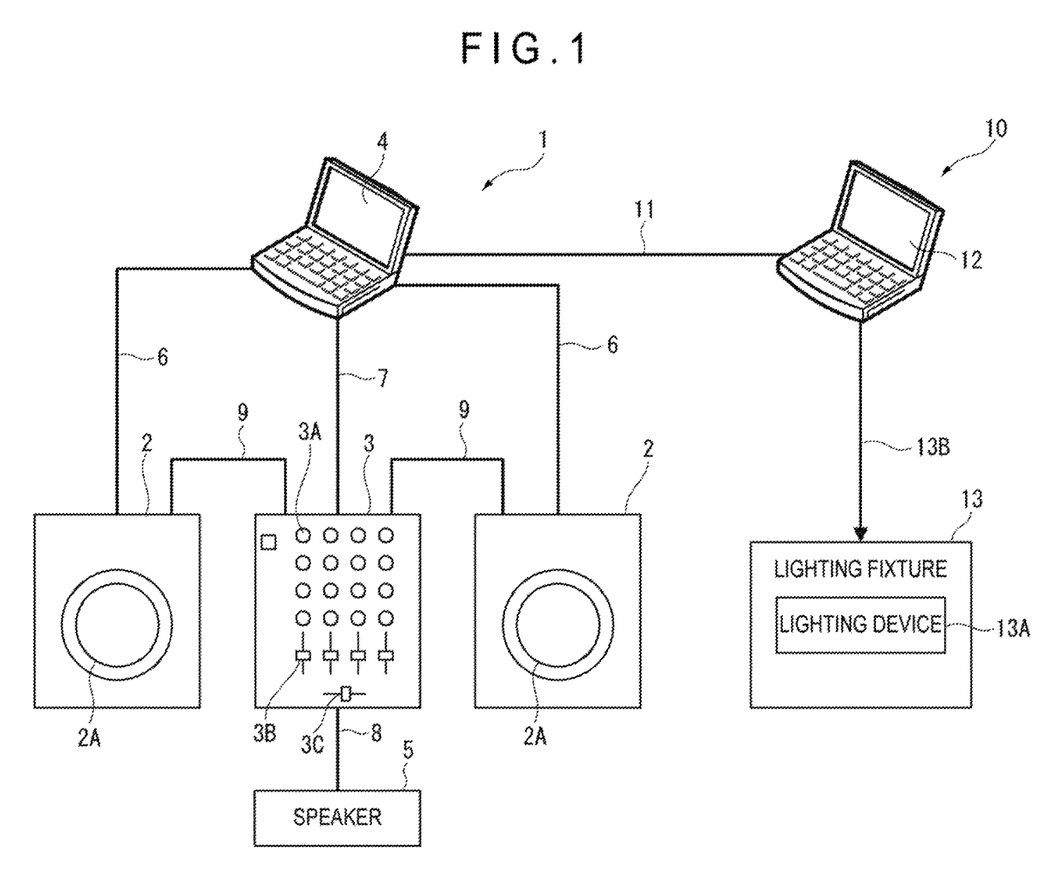
FIG. 1 is a block diagram showing a configuration of a sound control system and a lighting system according to an exemplary embodiment of the invention.

FIG. 1 shows a sound control system 1 and a lighting system 10 according to an exemplary embodiment of the invention, the sound control system 1 including two digital players 2, a mixer 3, a computer 4, and a speaker 5.

The digital players 2 each include a jog dial 2A and a plurality of control buttons (not shown). When a user of the digital players 2 operates the jog dial(s) 2A and/or the control button(s), sound control information corresponding to the operation is outputted. The sound control information is outputted to the computer 4 through a USB (Universal Serial Bus) cable 6 for bidirectional communication.

The mixer 3 includes a control switch 3A, a volume adjusting lever 3B, and a right-left switching lever 3C. Sound control information is outputted by operating these switch 3A and levers 3B, 3C. The sound control information is outputted to the computer 4 through a USB cable 7. The cable 7 may be compliant with a standard different from USB and the information may be outputted through wired communication or wireless communication. Further, the mixer 3 receives music piece information processed by the computer 4. The music piece information, which is inputted in the form of a digital signal, is converted into an analog signal and outputted in the form of sound from the speaker 5 through an analog cable 8.

Each of the digital players 2 and the mixer 3 are connected to each other through a communication cable 9, so that the sound control information generated by operating the digital player(s) 2 can be outputted directly to the mixer 3 for DJ performance without using the computer 4.

It should be noted that the digital players 2 and the mixer 3 are separate components in the exemplary embodiment but the invention may be applied to a DJ controller including an integrated unit of digital player and mixer.

The lighting system 10 includes a computer 12 connected to the computer 4 of the sound control system 1 through a communication cable 11 and a lighting fixture 13 configured to be controlled by the computer 12. It should be noted that each of the cables 6, 7, 9, 11 is not necessarily compliant with a specific standard but may be compliant with any other standard. Further, the components may be connected through wireless communication, such as wireless LAN (Local Area Network), instead of wired communication.

The lighting fixture 13, which provides lighting in a live-performance space and an event space, includes various lighting devices 13A frequently used as live-performance equipment.

Examples of the lighting devices 13A include a bar light, an electronic flash, and a moving head, which are frequently used for stage lighting. For each of the lighting devices 13A, parameters such as on and off of the lighting, brightness thereof, and, depending on the lighting device, an irradiation direction and a moving speed of the lighting device can be specified.

Although the computer 4 and the computer 12 are separate components in the exemplary embodiment, the same computer may be used as the computer 4 and the computer 12.

In order to control the above parameters, the lighting devices 13A of the lighting fixture 13, which comply with the DMX512 regulation, are connected to each other in accordance with the DMX512 regulation and lighting control signals 13B complying with the DMX512 regulation are sent to the lighting devices 13A to allow the lighting devices 13A to provide a desired lighting.

It should be noted that although the DMX512 regulation is the common regulation in the field of stage lighting, the computer 12 and the lighting fixture 13 may be connected in compliance with any other regulation.

[2] Arrangement of Functional Blocks of Sound Control System 1 and Lighting System 10

Figure 2:
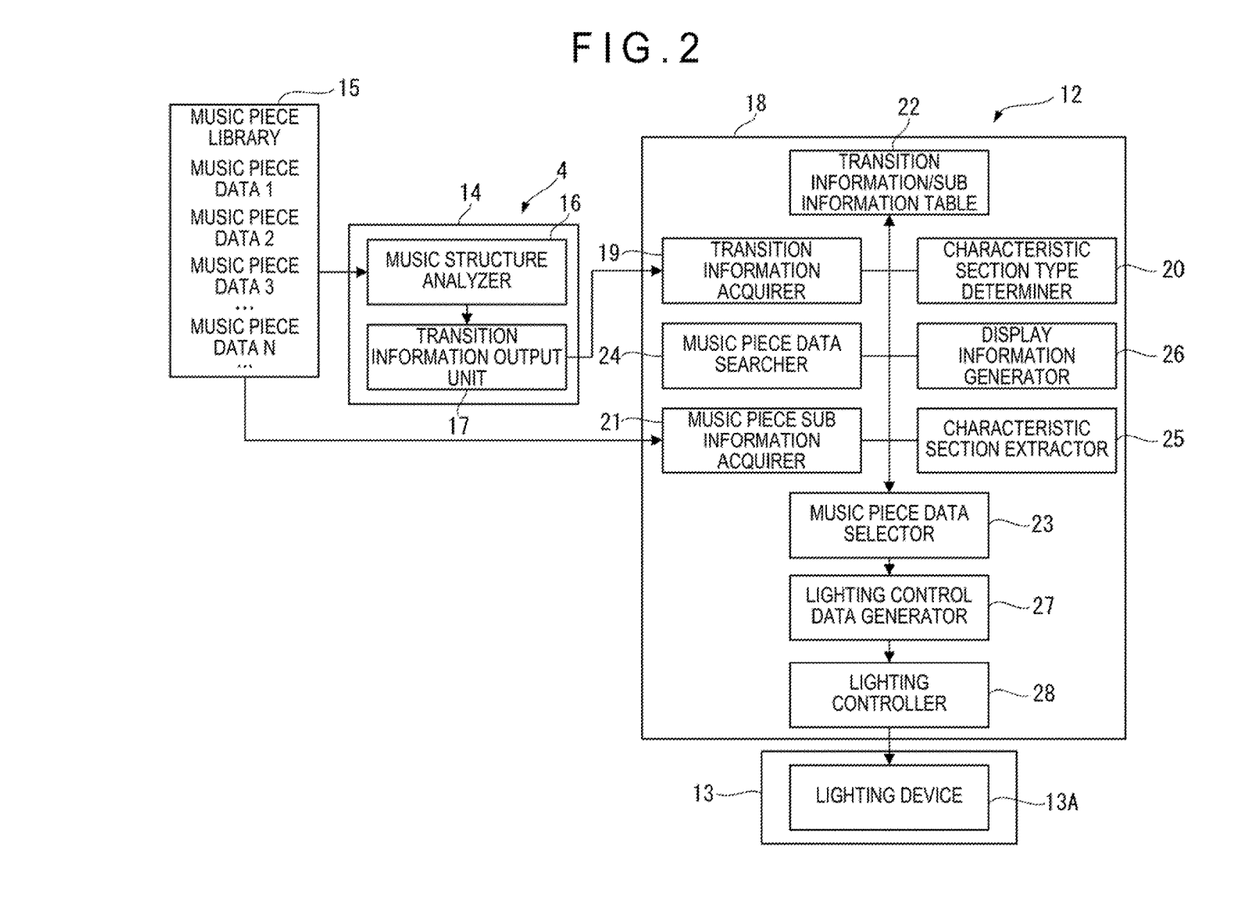
FIG. 2 is a block diagram showing the configuration of the sound control system and the lighting system according to the exemplary embodiment.

FIG. 2 shows a functional block diagram of the sound control system 1 and the lighting system 10 according to the exemplary embodiment.

The computer 4 of the sound control system 1 includes a processing unit 14 and a storage 15. The storage 15 stores music piece data of each of a plurality of music pieces 1 . . . N. The processing unit 14 includes a music structure analyzer 16 and a transition information output unit 17, which are computer programs configured to run on the processing unit 14.

The music structure analyzer 16 allocates characteristic sections, such as an introduction section, a verse section, a pre-chorus section, a chorus section, and an ending section, on each of the music pieces 1 . . . N stored in the storage 15 and generates transition information of each of the music pieces 1 . . . N.

It should be noted that the characteristic sections may be defined in a manner different from the above. For instance, the music piece may be divided into an up-tone section with an ascending melody, a hook section with a melodic climax, a down-tone section with a descending melody, and a break section subsequent to the hook section.

The music structure analyzer 16 may analyze the music structure in a variety of methods. According to an exemplary method, the music structure may be analyzed by subjecting the music piece data of each of the music pieces 1 . . . N to FFT (Fast Fourier Transform) per bar, counting the number of tones per bar to determine transition points where transition of the characteristic sections occurs, and allocating the characteristic sections between the transition points with reference to the numbers of tones. According to another exemplary method, the analysis may be performed by allocating the characteristic sections based on, for instance, melodic similarity in the music piece data. The analysis result is outputted to the transition information output unit 17.

The transition information output unit 17 outputs the transition information of each of the music pieces 1 . . . N generated by the music structure analyzer 16 to the computer 12 of the lighting system 10.

The computer 12 of the lighting system 10 includes a transition information acquirer 19, a characteristic section type determiner 20, a music piece sub information acquirer 21, a transition information/sub information table 22, a music piece data selector 23, a music piece data searcher 24, a characteristic section extractor 25, a display information generator 26, a lighting control data generator 27, and a lighting controller 28, which are configured to run on a processing unit 18.

Among the above, the transition information acquirer 19, the characteristic section type determiner 20, the music piece sub information acquirer 21, the transition information/sub information table 22, the music piece data selector 23, the music piece data searcher 24, the characteristic section extractor 25, and the display information generator 26 function as a music piece selecting device according to the invention. It should be noted that the transition information acquirer 19, the characteristic section type determiner 20, the music piece sub information acquirer 21, the transition information/sub information table 22, the music piece data selector 23, the music piece data searcher 24, the characteristic section extractor 25, and the display information generator 26 are each configured as a music piece selecting program readable by the computer 12.

The transition information acquirer 19 acquires the transition information of each of the music pieces 1 . . . N generated by the music structure analyzer 16 and writes the transition information in the predetermined transition information/sub information table 22.

Figure 3:
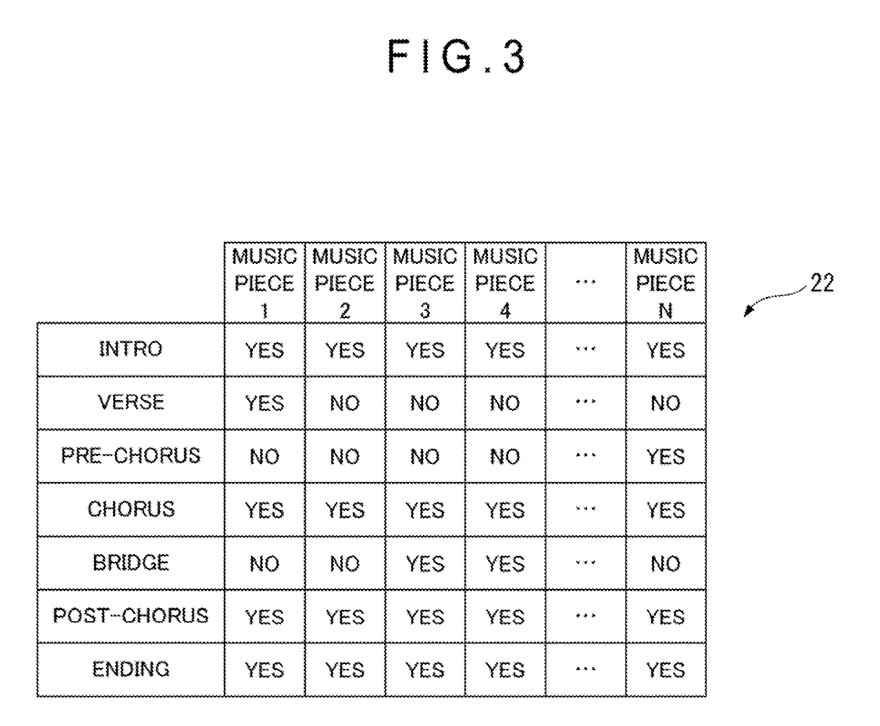
FIG. 3 schematically shows a transition information/ music piece sub information table according to the exemplary embodiment.

Specifically, as shown in FIG. 3, the transition information acquirer 19 determines whether each of the music pieces 1 . . . N contains any characteristic sections such as introduction section, verse section, pre-chorus section . . . and ending section and writes the results in the transition information/sub information table 22. It should be noted that the transition information/sub information table 22 is a matrix table containing a combination of the characteristic sections and sub information such as music genre information, musical tone information, and musical dynamics information.

The characteristic section type determiner 20 determines the respective types of the characteristic sections in each of the music pieces 1 . . . N written in the transition information/sub information table 22 by the transition information acquirer 19.

Specifically, the characteristic section type determiner 20 determines each of the characteristic sections contained in each of the music pieces 1 . . . N as, for instance, an introduction section, a verse section, a pre-chorus section, a chorus section, a bridge section, a post-chorus section, or an ending section. For instance, the music piece 2 shown in FIG. 3 is determined to contain four types of characteristic sections (i.e., introduction section, chorus section, post-chorus section, and ending section) by the characteristic section type determiner 20.

The music piece sub information acquirer 21 acquires the sub information added to each of the music pieces 1 . . . N stored in the storage 15 and writes the acquired music piece sub information in the transition information/sub information table 22.

Figure 4:
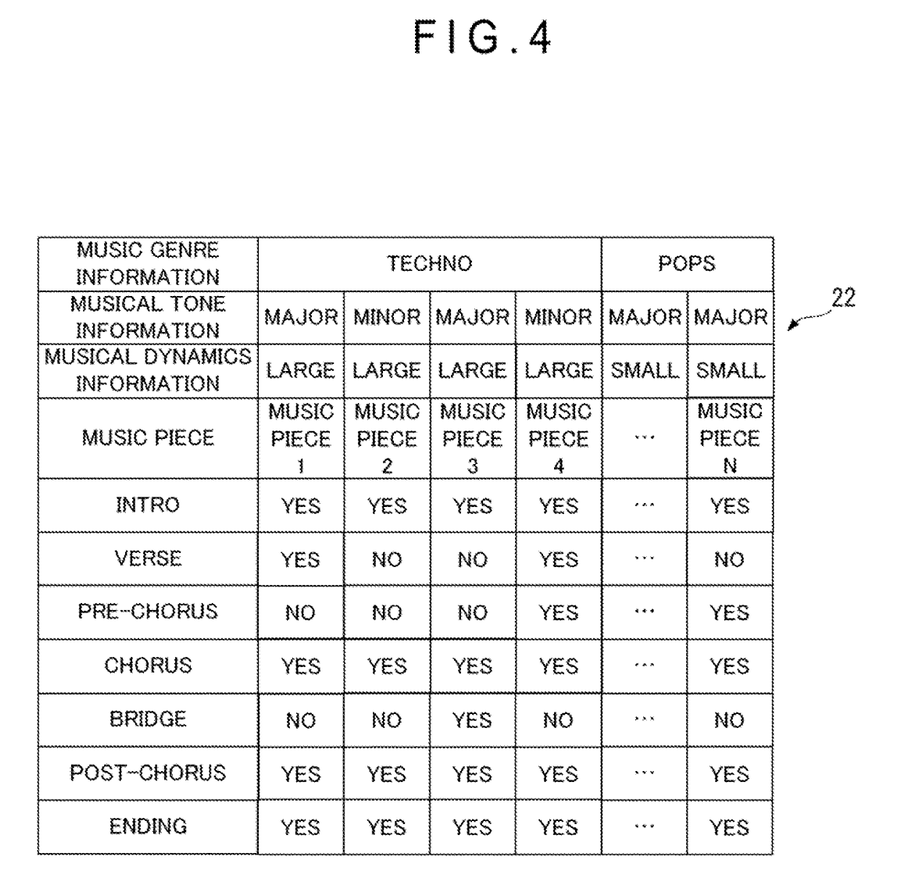
FIG. 4 schematically shows the transition information/ music piece sub information table according to the exemplary embodiment.

Specifically, the music piece sub information acquirer 21 acquires attributes, such as music genre information, musical tone information, and musical dynamics information, of each of the music pieces 1 . . . N recorded in, for instance, a header of the corresponding music piece data (e.g., MP3 data) and writes the respective attributes of the music pieces 1 . . . N as shown in FIG. 4. It should be noted that the music piece sub information is not necessarily added to the header information of the music piece data. Alternatively, the music piece sub information may be stored in a database in which the music piece data is related to the music piece data in a table format. Further, the music piece sub information is not limited to the music genre information, musical tone information, and musical dynamics information but may contain music beat information (e.g., 4-beats, 8-beats, and 16-beats).

The music piece data selector 23 selects a music piece suitable for generating lighting control data based on the types of characteristic sections determined by the characteristic section type determiner 20. Specifically, the music piece data selector 23 selects one of the music pieces 1 . . . N that contains the largest number of types of characteristic sections. For instance, as a result of comparing the music pieces 1 to 4 shown in FIG. 5, the music piece data selector 23 selects the music piece 4, since the music piece 4 contains six characteristic sections of all the types of characteristic sections (i.e., introduction section to ending section). The result of selection is outputted to the lighting control data generator 27.

When the first process of selecting the music piece data is completed and the characteristic section extractor 25 extracts the characteristic sections of the rest of music piece data, the music piece data selector 23 performs the next process of selecting the music piece data.

Figure 5:
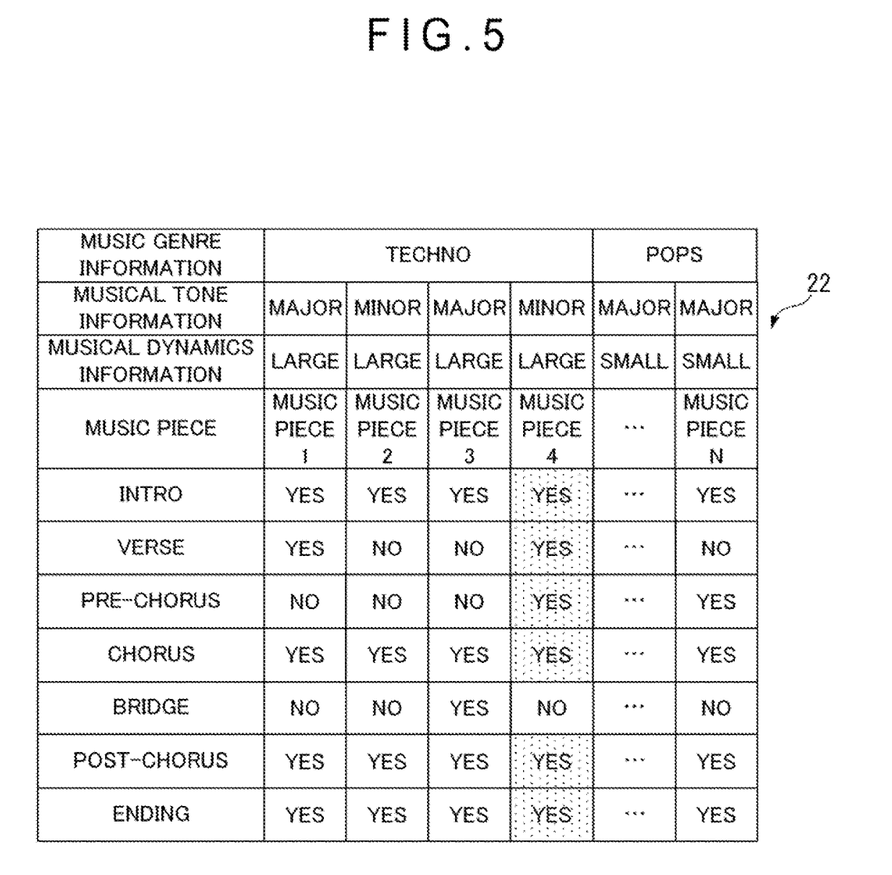
FIG. 5 schematically shows the transition information/ music piece sub information table according to the exemplary embodiment.

The music piece data searcher 24 searches for the music piece data related to the music piece data selected by the music piece data selector 23 among the rest of music piece data based on the types of characteristic sections determined by the characteristic section type determiner 20 and/or the music piece sub information acquired by the music piece sub information acquirer 21. Specifically, when the music piece 4 is selected by the music piece data selector 23 as shown in FIG. 5, the music piece data searcher 24 searches for the music piece data of each of the music pieces 1 to 3, which are categorized as techno music in common.

The characteristic section extractor 25 compares the characteristic sections in the music piece data of each of the music pieces 1 to 3 searched for by the music piece data searcher 24 with the characteristic sections in the music piece data of the music piece 4 selected by the music piece data selector 23 to extract the characteristic section(s) common to each other.

Figure 6:
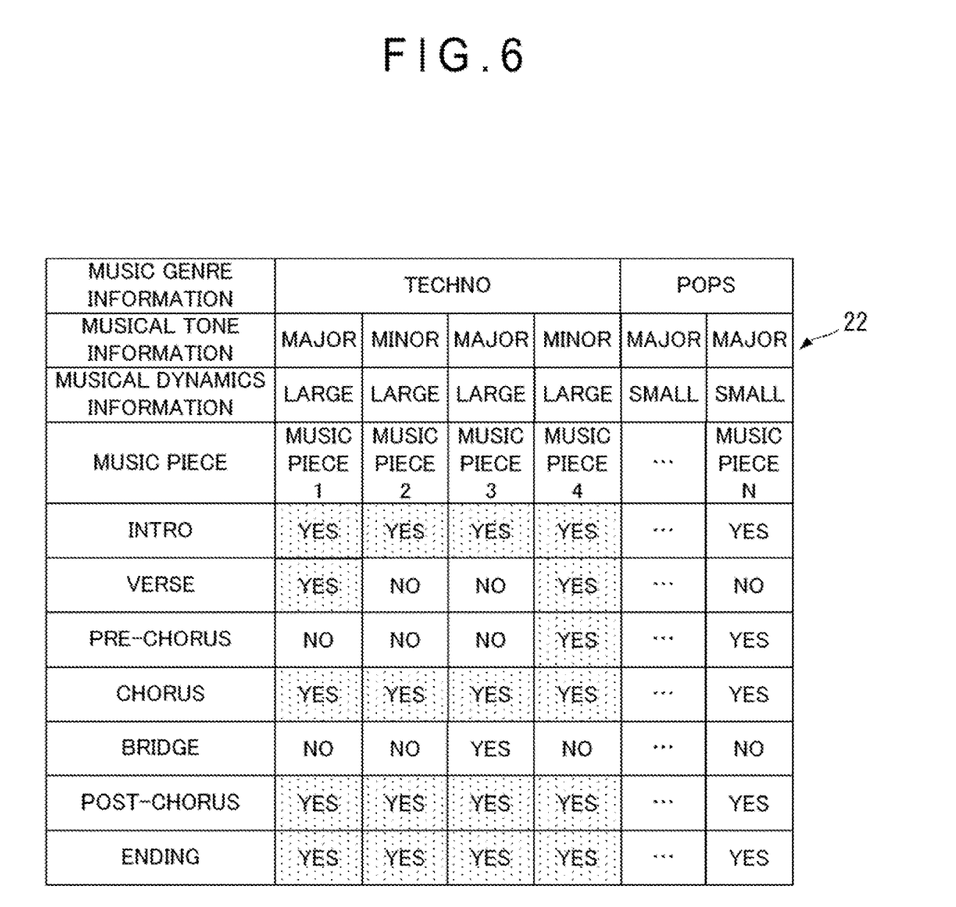
FIG. 6 schematically shows the transition information/ music piece sub information table according to the exemplary embodiment.

Specifically, as shown in FIG. 6, the characteristic section extractor 25 extracts the characteristic sections in each of the music pieces 1 to 3 that are the same as those in the music piece data of the selected music piece 4, such as the introduction section, the verse section, the pre-chorus section, the chorus section, the post-chorus section, and the ending section.

The display information generator 26 may generate display information in a matrix table showing the completion of extraction of the characteristic sections as shown in FIG. 6 and display this information on a display screen of the computer 12.

The lighting control data generator 27 generates lighting control data based on the music piece data of the music piece 4 selected by the music piece data selector 23. The lighting control data generated by the lighting control data generator 27 is outputted to the lighting controller 28.

Subsequently to the generation of the lighting control data for the music piece 4 selected by the music piece data selector 23, the lighting control data generator 27 assigns a part of the lighting control data for each of the characteristic sections in the music piece 4 to the corresponding (the same type of) characteristic section in each of the music pieces 1 to 3 and generates lighting control data for the characteristic section(s) not present in the music piece data of the music piece 4 (e.g., the bridge section of the music piece 3).

The lighting control data generated by the lighting control data generator 27 is in the form of data for DMX control software, which is to be processed by the lighting controller 28. It should be noted that the lighting controller 28, which is DMX control software configured to run in the computer 12 in the exemplary embodiment, may be a hardware controller connected to the computer 12.

The lighting controller 28 changes the lighting image (effect) depending on the characteristic sections as desired by controlling the lighting fixture 13 based on the lighting control data outputted from the lighting control data generator 27 so that lighting effects are provided using the lighting device 13A.

[3] Operations and Advantages of Exemplary Embodiment

Figure 7:
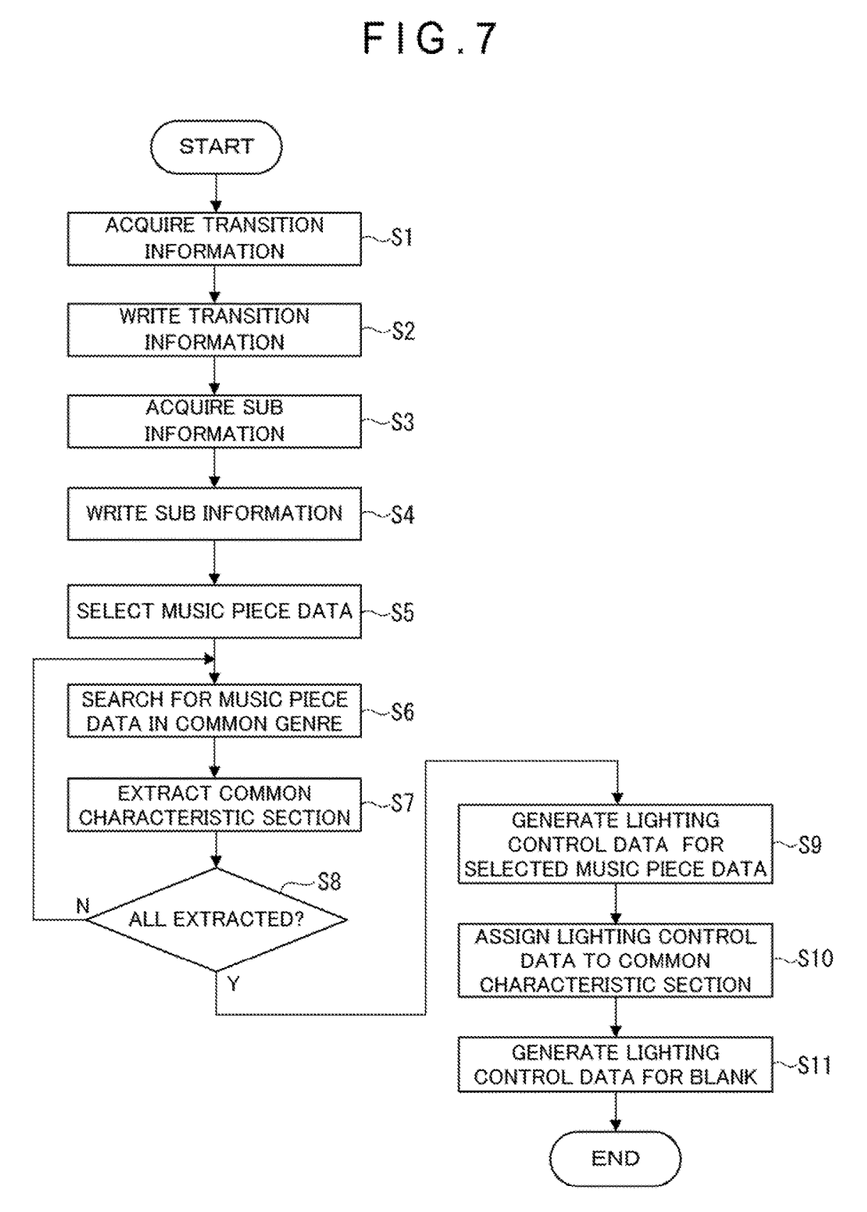
FIG. 7 is a flowchart for explaining the advantages of the exemplary embodiment.

Next, description will be made on operations, i.e., a music piece selecting method for selecting a music piece for generating lighting control data, according to the exemplary embodiment with reference to the flowchart shown in FIG. 7.

The transition information acquirer 19 acquires transition information outputted from the transition information output unit 17 (step S1) and writes the transition information in the transition information/sub information table 22 (step S2).

The music piece sub information acquirer 21 acquires attributes, such as music genre information, musical tone information, and musical dynamics information, added to the music pieces 1 . . . N (step S3) and writes the music piece sub information in the transition information/sub information table 22 (step S4). It should be noted that steps S1 to S2 and steps S3 to S4 may be simultaneously performed in parallel.

The characteristic section type determiner 20 determines the types of characteristic sections in the music piece data of each of the music pieces 1 . . . N and the music piece data selector 23 selects the music piece data with the largest number of types of characteristic sections (e.g., the music piece data of the music piece 4 in the instance shown in FIG. 5) based on the determined types of characteristic sections (step S5).

The music piece data searcher 24 searches for the music piece data of each of the music pieces 1 to 3, which is categorized in the same music genre (e.g., techno music in the instance shown in FIG. 5) as the music piece data of the music piece 4 selected by the music piece data selector 23 (step S6).

The characteristic section extractor 25 compares the characteristic sections in the searched music piece data of each of the music pieces 1 to 3 with the characteristic sections in the music piece data of the music piece 4 selected by the music piece data selector 23 and extracts the characteristic sections common to each other (step S7).

After completion of the extraction of the characteristic sections, the music piece data selector 23 selects the music piece data whose characteristic sections are not completely extracted (e.g., the music piece data of the music piece 3 containing the bridge section in the instance shown in FIG. 6) and repeats selection and extraction until all the characteristic sections of the music pieces 1 . . . N are extracted (step S8).

The lighting control data generator 27 generates lighting control data, which contains lighting effect data corresponding to each characteristic section, for the music piece data of the music piece 4 selected by the music piece data selector 23 (step S9).

Next, the lighting control data generator 27 generates lighting control data for each of the music pieces 1 to 3 by assigning the lighting effect data to the same type of characteristic section (step S10).

At the end of the process, the lighting control data generator 27 generates a piece of lighting control data for the bridge section in the music piece data of the music piece 3, the bridge section being not present in the music piece data of the music piece 4 (step S11).

When the lighting control data for each of the music pieces 1 to 4 is generated as described above, lighting effects are provided based on the generated lighting control data during a DJ performance using the music pieces 1 to 4.

The above exemplary embodiment provides the following advantages.

The music piece data selector 23 of the music piece selecting device allows for selecting the music piece data of the structurally complicated music piece 4 with the largest number of types of characteristic sections so that the lighting control data is generated based on this music piece data. The music piece data searcher 24 and the characteristic section extractor 25 allow for searching for the music pieces 1 to 3 in the same genre as the music piece 4 and assigning the piece of lighting control data for each of the characteristic sections in the music piece data of the music piece 4 to the corresponding (the same type of) characteristic section of each of the music pieces 1 to 3. The lighting control data can thus be efficiently generated and, consequently, the lighting effects for DJ performance can be efficiently set.

It should be noted that although the music piece selecting device is used for generating the lighting control data for the lighting fixture 13, the invention is not limited thereto. For instance, the lighting control data generating device is also used for generating effect control data for achieving pyrotronics effects using flame and smoke in some exemplary embodiments.

The invention claimed is:

1. A device for selecting a music piece for generating lighting control data, the device being configured to select, among pieces of music piece data each comprising transition information of characteristic sections that characterize a music structure, a target piece of music piece data suitable for generating the lighting control data for each of the pieces of music piece data, the device comprising:
   a transition information acquirer configured to acquire the transition information of the characteristic sections in each of the pieces of music piece data;
   a characteristic section type determiner configured to determine respective types of the characteristic sections based on the transition information of the characteristic sections acquired by the transition information acquirer; and
   a music piece data selector configured to select the target piece of music piece data for generating the lighting control data based on the respective types of the characteristic sections determined by the characteristic section type determiner.

2. The device for selecting a music piece for generating lighting control data according to claim 1, wherein the pieces of music piece data are each added with music piece sub information that relates the pieces of c piece data, the device further comprising:
   a music piece sub information acquirer configured to acquire the music piece sub information for each of the pieces of music piece data;
   a music piece data searcher configured to based on the music piece sub information acquired by the music piece sub information acquirer, search for at least one of the rest of music piece data that is related to the target piece of music piece data selected by the music piece data selector; and
   a characteristic section extractor configured to compare the characteristic sections in the piece of music piece data searched for by the music pies data searcher with the characteristic sections in the target piece of music piece data selected by the music piece data selector to extract at least one of the characteristic sections common to each other.

3. The device for selecting a music piece for generating lighting control data according to claim 2, further comprising a display information generator configured to generate display information showing, in a matrix form, the respective types of the characteristic sections determined by the characteristic section type determiner and the piece of music piece data related to the selected target music piece data searched, for by the music piece data searcher.

4. The device for selecting a music piece for generating lighting control data according to claim 1, wherein the respective types of the characteristic sections comprise at least one of an introduction section, a verse section, a chorus section, a post-chorus section, and an ending section.

5. The device for selecting a music piece for generating lighting control data according to claim 1, wherein the respective types of the characteristic sections comprise an introduction section, an up-tone section, a down-tone section, a hook section, a break section, and an ending section.

6. A non-transitory computer-readable medium stored with a program code, the program code being configured to, when read and executed by a computer, enable the computer to function as the device according to claim 1.

7. A method for selecting a music piece for generating lighting control data, the method being configured to select, among pieces of music piece data each containing transition information of characteristic sections that characterize a music structure, a target piece of music piece data suitable for generating the lighting control data for each of the pieces of music piece data, the method comprising:

acquiring the transition information of the characteristic sections in each of the pieces of music piece data;

determining respective types of the characteristic sections based on the transition information of the acquired characteristic sections; and selecting the target piece of music piece data for generating the lighting control data based on the respective types of the characteristic sections as determined.

\* \* \* \* \*